Nov. 24, 1931.  F. H. OWENS  1,833,371
MOTION PICTURE APPARATUS
Filed April 4, 1928   2 Sheets-Sheet 1
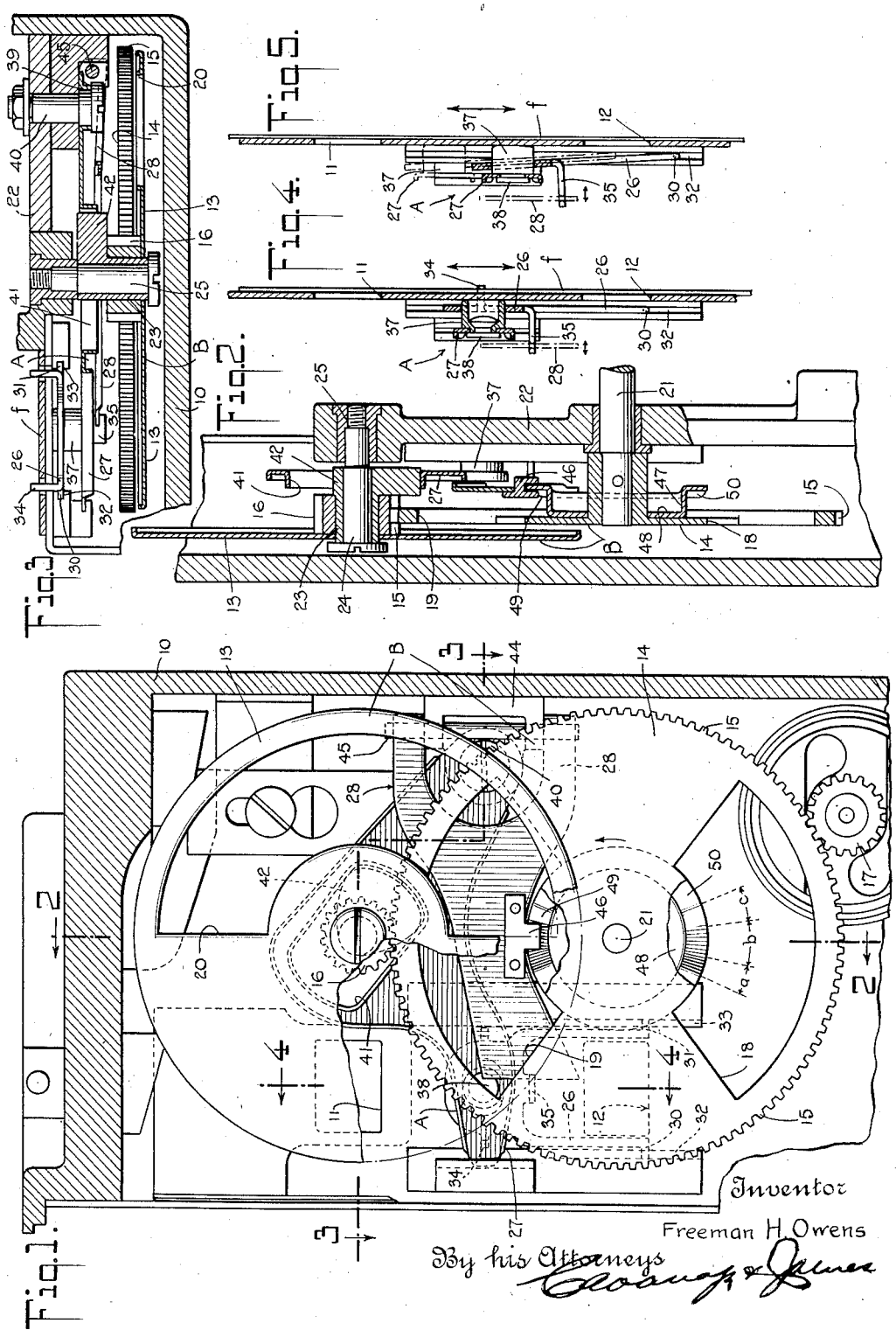
Inventor
Freeman H. Owens
By his Attorneys

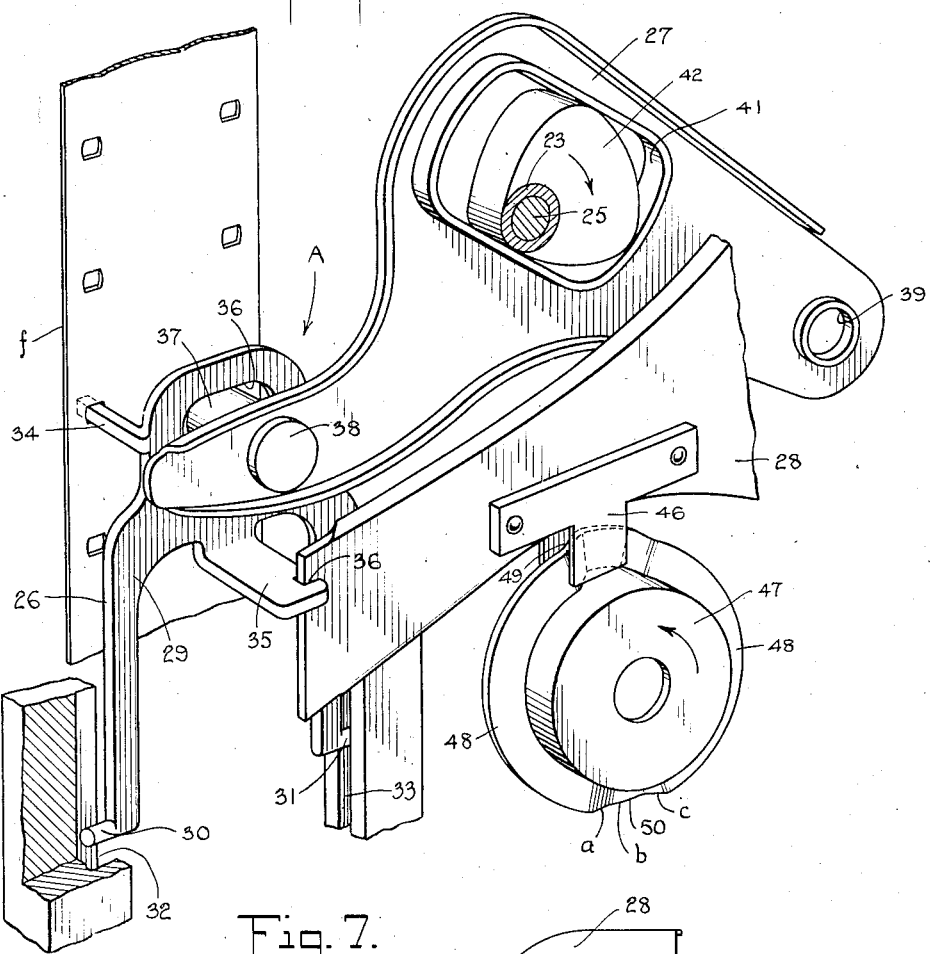
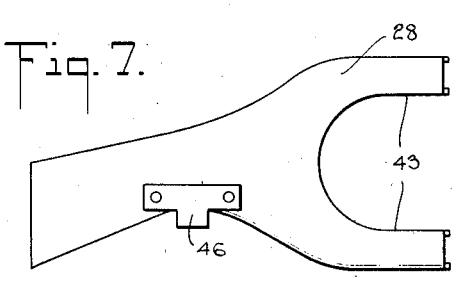
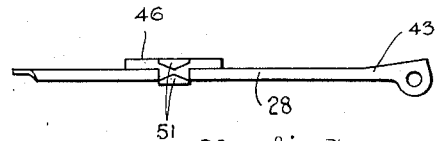

Patented Nov. 24, 1931

1,833,371

UNITED STATES PATENT OFFICE

FREEMAN H. OWENS, OF NEW YORK, N. Y.

MOTION PICTURE APPARATUS

Application filed April 4, 1928. Serial No. 267,159.

This invention relates to a motion picture apparatus, and relates more particularly to a motion picture apparatus adapted for both taking and projecting motion picture film; and has special reference to the provision of an improved shutter apparatus and intermittent film moving mechanism.

The prime desideratum of my present invention centers about the provision of a motion picture taking and projecting apparatus especially adapted for portable and amateur use; and to accomplish this, the present invention has for its principal object the provision of a shutter apparatus and an intermittent film moving mechanism utilizable for both taking and projecting use, embodying a design and construction affording simplicity of organization, certainty and reliability of operation, particularly for amateur use, and permitting manufacture on a production scale at a low cost and sale at a comparatively low figure.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my invention, and in which Fig. 1 is a cross sectional view of the camera casing presenting a rear elevational view of the apparatus forming the subject matter of the present invention.

Fig. 2 is a cross sectional view thereof taken in the plane of the line 2—2, Fig. 1, Fig. 3 is a view taken in cross section in the planes of the broken line 3—3, Fig. 1, Fig. 4 is a fragmentary view taken in cross section in the plane of the line 4—4, Fig. 1, Fig. 5 is a view similar to Fig. 4 showing the parts, however, in a different position of operation, Fig. 6 is a perspective taken on an enlarged scale showing the interrelation between the shutter apparatus and the film moving mechanism, and Figs. 7 and 8 are elevational and plan views of a detail.

Referring now more in detail to the drawings, I show a part of a camera and projector casing 10, the complete construction of which is disclosed in my copending application, Serial No. 267,157 filed on even date herewith, said casing being provided with film gate means having a film projecting opening 11 and a film taking opening 12 with which cooperates a single intermittent film moving mechanism generally designated as A and a shutter apparatus generally designated as B, the film moving mechanism A and shutter apparatus B being coordinated to produce the desired simplicity of construction and reliability of action.

The shutter apparatus B comprises a projector shutter 13 cooperating with the projector opening 11 and a camera shutter 14 cooperating with the camera opening 12, said shutters being made of a light-weight material such as sheet or stamped out stock, the shutters being geared together for rotation in unison, one shutter acting as a drive for the other, by means of gear teeth 15 formed peripherally on the shutter 14 which mesh with a pinion 16 which may be fixed directly to the projector shutter 13. The driving shutter 14 is in turn actuated by motor means connected to a pinion 17 which meshes with the formed gear teeth 15 of the camera shutter 14.

The ratio of gearing between the camera shutter 14 and the projector shutter 13 is such that the projector shutter 13 is given a rotational speed which is a multiple of that of the camera shutter, the high speed of rotation of the projector shutter being selected to give stability of operation to the shutter apparatus and the mechanism connected therewith, thus eliminating the use of relatively massive flywheel shutters necessitated in prior constructions where similar results are desired to be produced. In the particular embodiment herein disclosed the camera shutter 14 is provided with two shutter openings 18 and 19 and the projector shutter 13 is provided with a single opening 20, the ratio of gearing therebetween being six to one. With this construction it will be noted that for each camera film exposure the camera shutter is given a half of a revolution and for each projector film exposure the projector shutter is given three revolutions, the design and speed of rotation of the projector shutter therefore being such as to eliminate flickering of the projected image. The shutter 14 is fixed to a shutter shaft 21 journaled in the framework 22 and the shutter 13 is fixed to a sleeve portion 23 revoluble on a headed screw spindle 24 attached as at 25 to said framework 22.

The intermittent film moving mechanism A comprises a member generally designated as 26 which is movable in horizontal planes for engaging and disengaging the film *f* which is movable past the film openings 11 and 12, said member being movable in a vertical plane for moving said film past the exposure openings, these movements of the member 26 being produced by an element 27 driven by the rotation of one of the shutters and by an element 28 driven by the rotation of the other of the shutters of the machine.

The film engaging and moving member 26 best shown in Fig. 6 of the drawings comprises a means which may be made from sheet stock shaped to provide a body 29 having two trunnion pins 30 and 31 mounted for slidable and pivotal movement in guideways 32 and 33 respectively, said body 29 being provided with one or two outturned film engaging and moving fingers 34 and with a rearwardly turned tongue 35 which is notched as at 36 for receiving the edge portion of the element 28. The said film engaging and moving member 26 is also provided with a slot 36 which receives a roller 37, the said roller contacting the upper and lower walls of the slot 36, as clearly shown in Figs. 4 and 5 of the drawings, the said roller being journaled as at 38 adjacent the end of the element 27.

The elements 27 and 28 are mounted respectively for movement about horizontal and vertical axes so that movement of these elements will transmit the required motions to the film engaging and moving member 26. The element 27 which may also be made out of sheet material, the edges of which may be turned up for strengthening purposes, comprises an arm shaped as best shown in Figs. 1 and 6 of the drawings, which arm is provided with a pivot pin opening 39 which receives the headed pivot pin or bolt 40 fixed to the framework portion 22, as best shown in Fig. 3 of the drawings. The said arm or element 27 is further provided with an opening 41 defining an eccentric strap which receives an eccentric element 42 preferably formed integrally with the sleeve portion 23. The element 28 which also is preferably made out of sheet stock is bifurcated at one end producing the tines 43, 43 arranged to straddle a bracket 44 (see Fig. 1) the said bracket and tines receiving the vertical pivot pin 45, the said pivot pin defining the vertical axis about which the element 28 is oscillatable. For oscillating the element 28 the same is provided with a cam follower 46 which follows cam surfaces provided in a cam element 47 fixed to the camera shutter 14. This cam 47, as will be described further hereinbelow, causes the element 27 to oscillate about its axis, and the said oscillations are transmitted by means of the tongue 35 to the film engaging and moving member 26.

With the construction thus far described it will be seen that the film engaging and moving member 26 is moved in the vertical plane of the guideways 32 and 33 by the oscillations of the element 27 about its horizontal axis produced by the rotation of the upper or projector shutter 13, and that the said member 26 is moved pivotally about the movable trunnion pins 30 and 31 between film engaging and disengaging positions by means of the oscillations of the element 28 about its vertical axis produced by the rotation of the lower or camera shutter 14. It will be noted, moreover, that the sliding connection between the tongue 35 and the edge portion of the element 28 permits of the movement in a vertical plane of the film moving member 26, and that the loose connection between the roller 37 and the slot 36 permits of the pivotal film engaging and disengaging motion of the member 26.

It will be understood from the foregoing that for every three revolutions of the projector shutter 13, it is desired to move the film but one image space. This is controlled by the design and construction of the cam element 47, which element may also be made out of sheet stock shaped into the configuration best shown in Figs. 2 and 6 of the drawings. This cam element 47 is provided with a flanged portion 48 having at diametrically positioned points the cammed portions 49 and 50, each of these portions being sub-divided into an inclined section *a*, a straight adjoining section *b* and an oppositely inclined section *c*, the zones of these sections being clearly designated in Fig. 1 of the drawings. The cam follower 46 is in turn provided with the oppositely positioned fingers 51 which straddle the cam flange 48 so that an accurate cam following movement is produced. In Fig. 1 of the drawings the cam follower 46 is shown in engagement with the region *b* of the cam face 49 at its mid-point, while in Fig. 6 of the drawings the cam follower is shown in engagement with the line of junction between the regions *a* and *b* of the cam face; the cam element 47 being considered as moving in the direction shown by the arrows associated therewith. With this described construction it will be therefore evident that when the cam follower 46 is riding on the zones *a*, *b* and *c* of a cam face 49 or 50, the film engaging member 26 is moved first into engagement with the film apertures and is then moved to move the film an image area, and is then moved out of engagement with the film, and that when the cam follower 46 is riding on the remaining portions of the flange 48 of the cam element, the film engaging and moving member 26 is held out of engagement with the film although the same is being moved in vertical planes by the arm 27. It is the cam element 47 therefore that determines the engagement and film moving functions of the film engaging and moving member 26.

The manner of making and operating the motion picture apparatus of my present invention and the many advantages thereof will, in the main, be fully apparent from the above detailed description thereof. In operation, it will be seen that the rotation of one of the shutters 14 is transmitted to the other shutter 13 by motion increasing gearing, and that these two shutters in unison operate the elements of the film moving mechanism A, this mechanism embodying the film engaging and moving member 26 which is movable in the vertical plane as shown by the double arrowed lines in Figs. 4 and 5 of the drawings, for moving the film and which is movable in horizontal planes as shown by the double arrowed lines in said Figs. 4 and 5 of the drawings to cause the said member 26 to engage and disengage the film *f*. The high speed of operation of the projector shutter produces a flywheel stability without the use of any massive element, thus permitting the manufacture of the various shutter and film moving mechanism parts out of comparatively light-weight sheet metal stock, all organized to produce a very portable, inexpensive and light-weight construction. The direct operative connection between the shutters and the control of the film moving mechanism by both of these shutters jointly is a factor in eliminating or minimizing back lash and looseness between the operating parts so that the whole organization possesses an optimum reliability of action although the parts are made in an inexpensive way.

It will also be apparent that while I have shown and described my invention in the preferred form, many changes and modifications may be made in the structure disclosed without departing from the spirit of the invention, defined in the following claims.

I claim:

1. In a combined film taking and projecting apparatus, a casing having a film projecting opening and a film taking opening, a pair of separate shutters one for each film opening, means for rotating said shutters, and an intermittent film moving mechanism operative in association with both said film openings for intermittently moving motion picture film past both said openings, said mechanism comprising a film engaging and moving means, and a plurality of elements, one driven by the rotation of one and another by the rotation of the other of said shutters, for operating said means to cause the same to engage and disengage the film and to move the film.

2. In a motion picture apparatus, a casing having a pair of film exposure openings, a pair of separate shutters one for each film opening, means for rotating said shutters simultaneously and an intermittent film moving mechanism operative in association with both said film openings for intermittently moving motion picture film past both said openings, said mechanism comprising a film engaging and moving means, and a plurality of elements, one driven by the rotation of one and another by the rotation of the other of said shutters, for operating said means to cause the same to engage and disengage the film and to move the film.

3. In a combined film taking and projecting apparatus, a casing having a film projecting opening and a film taking opening, a pair of shutters one for each film opening, means for rotating said shutters at different rotational speeds, and an intermittent film moving mechanism operative in association with both said film openings for intermittently moving motion picture film past both said openings, said mechanism comprising a film engaging and moving means and elements operated by the rotation of both of said shutters for operating said means to cause the same to engage and disengage the film and to move the film.

4. In a combined film taking and projecting apparatus, a casing having a film projecting opening and a film camera opening, a projector shutter for the projector opening and a camera shutter for the camera opening, means for rotating said shutters, said means being operative to rotate the projector shutter at a rotational speed greater than that of the camera shutter, and an intermittent film moving mechanism operative in association with both said film openings for intermittently moving motion picture film past both said openings, said mechanism comprising a film engaging and moving means and elements operated in predetermined relation by the rotation of both of said shutters for operating said means to cause the same to engage and disengage the film and to move the film.

5. In a motion picture apparatus, a casing having a pair of film exposure openings, a pair of shutters one for each film opening, means for rotating said shutters simultaneously and an intermittent film moving mechanism operative in association with both said film openings for intermittently moving motion picture film past both said openings, said mechanism comprising a member movable for engaging and disengaging said film and for moving said film, an element driven by the rotation of one of said shutters for operating said member to engage and disengage the film, and an element driven by the rotation of the other of said shutters for operating said member to move the film.

6. In a combined motion picture film taking and projecting apparatus, a casing having a camera film opening and a projector film opening, a pair of shutters one for each film opening, means for rotating said shutters simultaneously and an intermittent film moving mechanism operative in association with both said film openings for intermittently moving motion picture film past both said openings, said mechanism comprising a member movable in horizontal planes for engaging and disengaging said film and in a vertical plane for moving said film, an element driven by the rotation of one of said shutters for operating said member to engage and disengage the film, and an element driven by the rotation of the other of said shutters for operating said member to move the film.

7. In a motion picture apparatus, a casing having a pair of film exposure openings, a pair of shutter shafts, shutters mounted on said shafts, one shutter for each film opening, gearing connecting said shutters for causing one shutter to drive the other, and an intermittent film moving mechanism operative in association with both said film openings for intermittently moving motion picture film past both said openings, said mechanism comprising a member movable into and out of engagement with the film for moving said film, a means operated from one of said shutter shafts for moving said member into and out of film engaging position and a means operated from the other of said shutter shafts for moving said member in a direction to move said film.

8. In a combined motion picture film taking and projecting apparatus, a casing having a pair of film exposure openings, a pair of shutter shafts, shutters mounted on said shafts, one shutter for each film opening, motion increasing gearing connecting said shutters for causing one shutter to drive the other at an increased rotational speed, and an intermittent film moving mechanism operative in association with both said film openings for intermittently moving motion picture film past both said openings, said mechanism comprising a member movable into and out of engagement with the film for moving said film, a means operated from one of said shutter shafts for moving said member into and out of film engaging position and a means operated from the other of said shutter shafts for moving said member in a direction to move said film.

9. In a motion picture apparatus, a casing having a pair of film exposure openings, a pair of shutter shafts, shutters mounted on said shafts, one shutter for each film opening, means connecting said shutters for driving the same, and an intermittent film moving mechanism operative in association with both said film openings for intermittently moving motion picture film past both said openings, said mechanism comprising a member mounted for pivotal movement about a horizontal axis, a second member mounted for pivotal movement about a vertical axis, film engaging and moving means operated by both the said members, an element operated from one of said shutter shafts for moving one of said members about its horizontal axis, and an element operated from the other of said shutter shafts for moving the second member about its vertical axis.

10. In a combined motion picture film taking and projecting apparatus, a casing having a camera film opening and a projector film opening, a pair of shutter shafts, shutters mounted on said shafts, one shutter for each film opening, gearing connecting said shutters for causing one shutter to drive the other, the projector shutter being driven at a rotational speed greater than that of the camera shutter, and an intermittent film moving mechanism operative in association with both said film openings for intermittently moving motion picture film past both said openings, said mechanism comprising a member mounted for pivotal movement about a horizontal axis, a second member mounted for pivotal movement about a vertical axis, film engaging and moving means operated by both the said members, an element operated from one of said shutter shafts for moving one of said members about its horizontal axis, and an element operated from the other of said shafts for moving the second member about its vertical axis.

11. In a motion picture apparatus, a casing having a pair of film exposure openings, a pair of shutter shafts, shutters mounted on said shafts, one shutter for each film opening, means connecting said shutters for driving the same in predetermined relation, and an intermittent film moving mechanism operative in association with both said film openings for intermittently moving motion picture film past both said openings, said mechanism comprising a member mounted for pivotal movement about a horizontal axis, a second member mounted for pivotal movement about a vertical axis, film engaging and moving means operated by both the said members, a guideway in which said film engaging and moving means is slidably and pivotally mounted, an eccentric element operated from one of said shutter shafts for moving one of said members about its horizontal axis, and a cam element operated from the other of said shafts for moving the second member about its vertical axis.

12. In a combined film taking and projecting apparatus, a casing having a film projecting opening and a film camera opening, a projector shutter for the projector opening and a camera shutter for the camera opening, means for rotating the shutters simultaneously, said means including mechanism for rotating the projector shutter at a rotational speed which is a multiple of the rotational speed of the camera shutter, and an intermittent film moving mechanism operative in association with both said film openings for intermittently moving motion picture film past both of said openings.

13. In a combined film taking and projecting apparatus, a casing having a film projecting opening and a film camera opening, a projector shutter for the projector opening and a camera shutter for the camera opening, motion increasing gearing means directly connecting said shutters for rotating the shutters simultaneously, said means operating for rotating the projector shutter at a rotational speed which is a multiple of the rotational speed of the camera shutter, and an intermittent film moving mechanism operative in association with both said film openings and operated from said shutters for intermittently moving motion picture film past both of said openings.

14. In a combined film taking and projecting apparatus, a casing having a film projecting opening and a film camera opening, a projector shutter for the projector opening and a camera shutter for the camera opening, means for rotating the shutters simultaneously, said means including mechanism for rotating the projector shutter at a rotational speed which is a multiple of the rotational speed of the camera shutter, an intermittent film moving mechanism operative in association with both said film openings for intermittently moving motion picture film past both of said openings, and means connecting said mechanism with said shutters whereby the camera shutter is rotated a half of a revolution for each film image and the projector shutter is rotated three revolutions for each film image.

Signed at Rome, Italy, this twentieth day of March A. D. 1918.

FREEMAN H. OWENS.